Foltz & McCool,
Cider-Mill.

No. 100,517.  Patented Mar. 8, 1870.

Witnesses.  Inventors.

Foltz & McCool,
Cider Mill.
No. 100,517. Patented Mar. 8, 1870.

Witnesses:

Inventors:

United States Patent Office.

W. K. FOLTZ AND W. A. McCOOL, OF ASHLAND, OHIO.

Letters Patent No. 100,517, dated March 8, 1870.

IMPROVEMENT IN WINE AND CIDER-MILLS.

The Schedule referred to in these Letters Patent and making part of the same.

To all whom it may concern:

Be it known that we, W. K. FOLTZ and W. A. McCOOL, of Ashland, in the county of Ashland, and State of Ohio, have invented a certain new and improved Wine and Cider-Mill; and we do hereby declare that the following is a full, clear, and complete description of the same, reference being had to the accompanying drawings making part of this specification, in which drawings—

Figure 1:
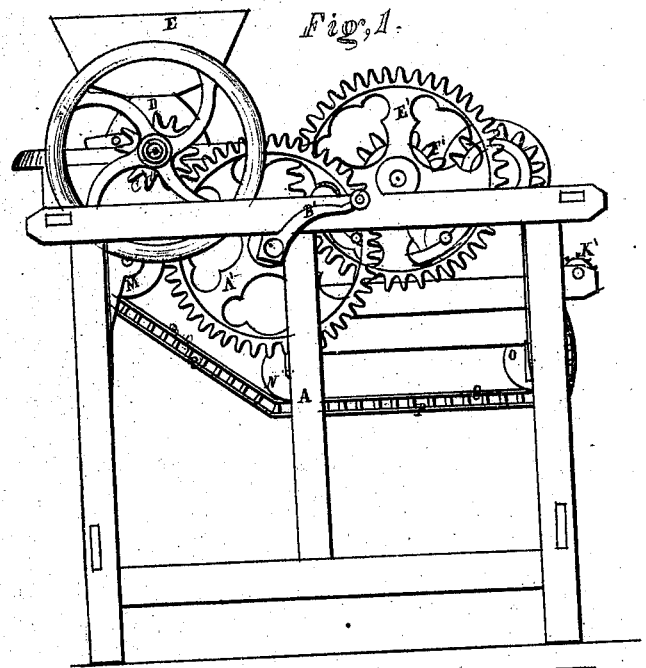
Figure 2:
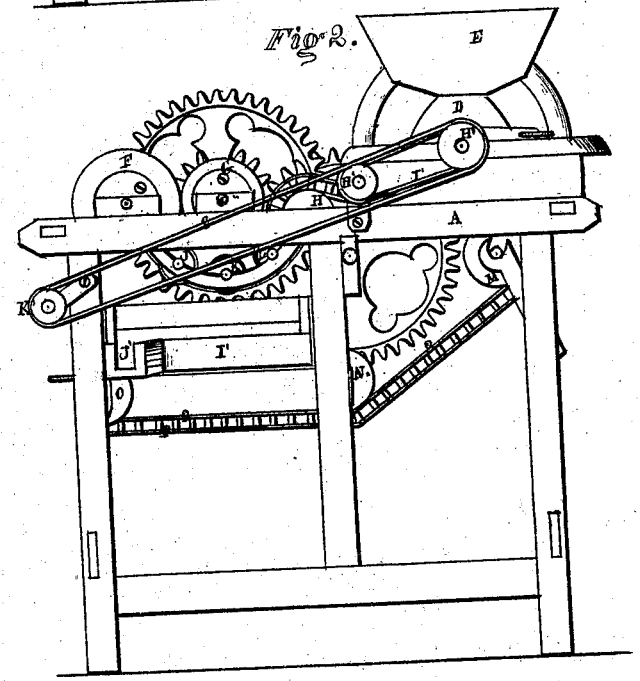
Figure 3:
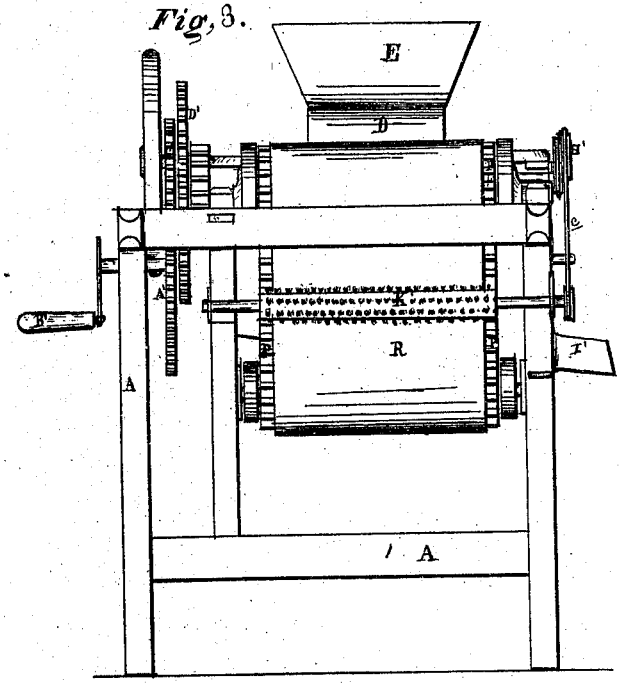
Figure 4:
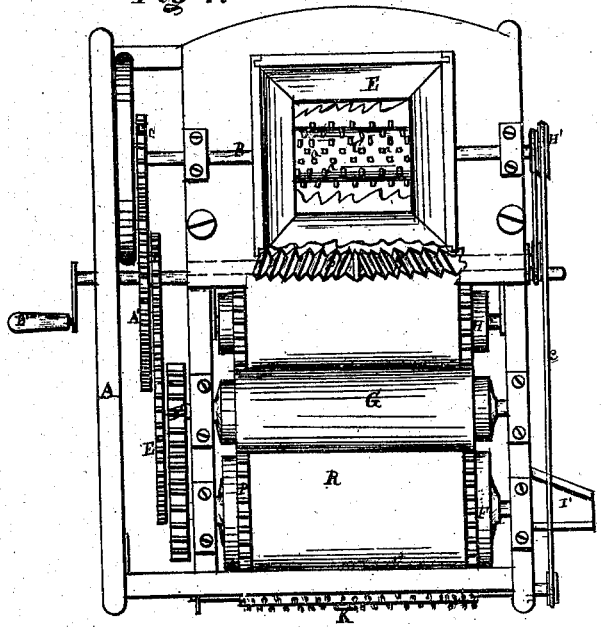

Figure 1 is a side view of the mill.
Figure 2, a view of the opposite side of fig. 1.
Figure 3, a front view.
Figure 4, a view of the top.

Like letters of reference refer to like parts in the several views.

Objective.

This invention relates to a wine and cider-mill, the peculiar construction of which is such that the fruit is ground and pressed in one continuous operation by means of a mill consisting of a toothed cylinder and a press, consisting of a series of rollers to which the pumice is conveyed by means of an endless apron, all of which is hereinafter more fully described.

Descriptive.

In fig 1, A represents a frame, in the top of which, near to one end, is mounted on the shaft B, fig. 4, a cylinder, C, studded with a series of teeth, a, whereby the fruit is torn and reduced to the condition of pomace.

Said cylinder is inclosed in a case, D, on the top of which is mounted a hopper, E, all of which comprise the mill-part of the machine.

In the top, near the front end of said frame, is journaled a roller, F; also, in close relation therewith, is journaled a smooth, solid roller, G; and in close relation to said roller G is journaled a roller, H.

Immediately below said rollers, and in close relation therewith, is journaled in a stay, I, fig. 2, a series of three rollers, J K L.

Also, in said frame is journaled a series of rollers, M N O, the purpose of which will presently be shown.

P, figs. 1 and 2, is an endless, open apron, constructed of slats, the slats being connected to each other by belts Q.

Said apron is stretched over and around the several rollers J K L and M N O, and is made to revolve by the rotation of the roller F, the other rollers being auxiliary thereto, for the purpose of giving tension and direction to the apron.

Said apron is covered by a textile apron, R, and revolves conjointly therewith, as and for a purpose hereinafter shown.

S, fig. 4, is a distributing-screw, which, as will be observed, consists of a left-and-right handed thread, each thread terminating at the middle of the apron and running outwardly to the edges thereof.

Motion is given to the cylinder and to the several rollers by a system of gearing, consisting of a driving-wheel, A', figs. 1 and 4, to which motion is given by the crank B', and from which the pinion C' receives motion for driving the cylinder.

From the pinion D', fig. 4, mounted on the shaft with the driving-wheel A', motion is transferred to the wheel E', giving motion thereby to the smooth, solid roller G, on the shaft of which is keyed a gear, F', from which the gear G' receives motion for driving the roller F, whereby the aprons are carried.

Operative.

Having thus described the construction and general arrangement of the mill, the practical operation of the same is as follows, viz:

The fruit on being thrown into the hopper E is quickly reduced to a pomace by the toothed cylinder, and from which it falls upon the aprons, passing in their revolution under the mill.

The reduced fruit is equally spread over said aprons by the distributing-screw S, which is made to rotate by a belt, E', and pulleys H', fig. 2.

The pomace thus distributed is carried by the aprons to the pressing or solid roller G, under which it is conveyed and pressed consecutively between it and the rollers H L, R J.

The juice, as it is expressed, is strained by the textile apron and falls through the slat or open apron down into the vat I', from which it flows through the spout J' into casks or tubs provided therefor.

The pomace after being thus pressed is carried over the roller F' on the apron, and is removed therefrom by a brush, K', fig. 3, driven by a belt, c, from the pulley H', thereby leaving the apron clean for the reception of a fresh supply of pomace on its return to the mill. Thus the fruit is reduced to pomace, pressed and strained by one direct and continuous operation.

It will be observed that the aprons and the roller F, whereby they are carried, do not move or rotate equally together, in consequence of the diameter of said roller F being larger than that of the auxiliary rollers, and therefore it moves faster than the auxilaries, which retard the movement of the aprons and cause them to slip upon the roller F and rotate with the auxiliaries.

The purpose of this unequal movement of the aprons and roller is to bring the slats comprising the apron, and also every part of the textile apron, to bear on every part of the face of the pressing-roller, so that there shall be no unequal wearing of the surface in consequence of the slats coming at each revolution to the same place, or by repeated pressure exerted upon the textile apron, cause it to cut or wear through.

By this unequal movement of the roller G and the aprons, the roller is worn equally and smoothly over the entire extent of its surface, and greater durability obtained to the aprons.

*Claims.*

What we claim as our invention, and desire to secure by Letters Patent, is—

1. The arrangement, with rollers F G H and slotted apron P R, of the revolving brush K', right-and-left screw S, and cylinder C, all constructed and operating substantially as and for the purpose herein shown.

2. The slatted endless apron P and textile apron R, in combination with the rollers F G H and J K L and screw S, in the manner as described, and for the purpose specified.

W. K. FOLTZ.
W. A. McCOOL.

Witnesses:
W. H. BURRIDGE,
J. H. BURRIDGE.